United States Patent
Messelling et al.

(10) Patent No.: US 6,460,754 B1
(45) Date of Patent: Oct. 8, 2002

(54) PREVENTION OF BRAZE ALLOY FLOW AND STOPOFF MATERIAL THEREFOR

(76) Inventors: William G. Messelling, 389 Wellington Ct., Mason, OH (US) 45040; Richard W. Geibel, 7076 Goldengate Dr., Cincinnati, OH (US) 45244

(*) Notice: Subject to any disclaimer, the term of this patent is extended or adjusted under 35 U.S.C. 154(b) by 0 days.

(21) Appl. No.: 09/632,019

(22) Filed: Aug. 2, 2000

(51) Int. Cl.$^7$ .............................. B23K 1/20; B32B 27/02
(52) U.S. Cl. ..................... 228/214; 428/329; 428/407
(58) Field of Search .......................... 228/214, 219, 228/118, 216, 50; 428/327, 329, 407, 425.9, 577, 596, 586; 521/55; 164/527; 252/1, 62.3 R, 62.3 V, 62.3 BT

(56) References Cited

U.S. PATENT DOCUMENTS

| | | | | |
|---|---|---|---|---|
| 3,761,872 A | * | 9/1973 | Ebinger | 339/276 T |
| 3,837,880 A | * | 9/1974 | Behringer et al. | 117/5.5 |
| 3,906,617 A | * | 9/1975 | Behringer et al. | 228/118 |
| 4,293,089 A | * | 10/1981 | McCormick et al. | 228/215 |
| 4,400,870 A | * | 8/1983 | Islam | 29/588 |
| 4,439,250 A | * | 3/1984 | Acharya et al. | 148/23 |
| 5,240,888 A | * | 8/1993 | Yamamura et al. | 501/95 |
| 5,312,687 A | * | 5/1994 | Pollet et al. | 428/372 |
| 5,342,573 A | * | 8/1994 | Amano et al. | 419/38 |
| 5,360,686 A | * | 11/1994 | Peled et al. | 429/191 |
| 5,511,721 A | | 4/1996 | Demo et al. | |
| 5,554,271 A | * | 9/1996 | Illston et al. | 204/479 |
| 5,575,964 A | * | 11/1996 | Umezaki et al. | 264/60 |
| 5,736,198 A | * | 4/1998 | Yasutomi et al. | 427/419.7 |
| 5,935,718 A | | 8/1999 | Demo et al. | |
| 6,025,111 A | * | 2/2000 | Schell et al. | 430/212 |
| 6,117,534 A | * | 9/2000 | Yamamura et al. | 428/291.1 |

* cited by examiner

*Primary Examiner*—Tom Dunn
*Assistant Examiner*—Zidia Pittman
(74) *Attorney, Agent, or Firm*—Senniger, Powers, Leavitt & Roedel

(57) ABSTRACT

A method for forming a barrier to flow of brazing alloy on the surface or into internal cavities of a component to be treated by brazing. A quantity of stopoff slurry comprising alumina and a polyethylene oxide binder is applied to a surface of the component or into internal cavities of the component. The slurry is dried to set the binder and form a hardened stopoff material on the surface or in the internal cavities to form a barrier to flow of brazing material.

14 Claims, No Drawings

PREVENTION OF BRAZE ALLOY FLOW AND STOPOFF MATERIAL THEREFOR

BACKGROUND OF THE INVENTION

This invention relates to a method for repairing or otherwise treating metal components by brazing. In particular it relates to a method for preventing flow of brazing alloy onto selected surfaces and into internal cavities of components being brazing, and to a stopoff material for use as a barrier to flow of braze alloy.

Holes, cracks, chips, and other defects in metal components are often repaired by furnace brazing. When such components have internal cavities, as is the case with, for example, gas turbine engine airfoils, the repair alloy has a tendency in some instances to flow into the internal cavities. This is not desirable because when the alloy solidifies in the internal cavities, it changes the internal configuration, weight, and weight distribution of the component to other than the engineered parameters, and may even clog internal cavities. As such, slurries, preforms, and putties have been used as internal maskant, often referred to as internal stopoff, to prevent the flow of braze alloy into internal cavities during repair.

It is also desirable to prevent the flow of braze alloy into slots and onto certain surfaces during brazing, such that there is a need for a way to form barriers to flow of braze alloy.

SUMMARY OF THE INVENTION

Briefly, therefore, the invention is directed to a method for forming a barrier to flow of brazing alloy on a component to be treated by brazing. A quantity of stopoff slurry comprising an oxide powder and a binder is applied to a surface of the component. The stopoff slurry is dried to set the binder and form a hardened stopoff material on the surface to form a barrier to flow of brazing material.

The invention is also directed to a method for preventing flow of brazing alloy into an internal cavity of a component being repaired by brazing. The internal cavity is charged with a stopoff slurry comprising powdered oxide and a binder. The stopoff slurry is dried to set the binder and form a hardened stopoff material in the internal cavity which seals openings into the internal cavity.

The invention is further directed to stopoff slurry for application to internal cavities of components to be repaired by brazing to seal the internal cavities and prevent the flow of brazing alloy into the internal cavities, the stopoff slurry comprising alumina and a polyethylene oxide binder, the polyethylene oxide binder comprising polyethylene oxide and water.

DETAILED DESCRIPTION OF THE INVENTION

In accordance with the process of the invention, a stopoff slurry is prepared from a binder and an oxide powder.

The binder according to this invention preferably employs polyethylene oxide (PEO), which is a fine, water-soluble, white powder having a chemical formula of $(-CH_2CH_2O-)_n$. PEO is available from, for example, Aldrich Chemical Company of Milwaukee, Wis. When PEO is mixed with distilled or deionized water, the resulting mixture is a viscous fluid. This fluid serves as a binder slurry which is then mixed with an oxide powder to form a stopoff slurry.

In one particularly preferred embodiment, the binder contains PEO in an amount from about 20% to about 25% by weight, more preferably about 20% by weight. In this preferred embodiment, the binder contains water in an amount from about 75% to about 80% by weight, more preferably about 80% by weight. In forming the binder, these components are weighed out, and the water is added to the PEO, or the PEO is added to the water. The water is preferably moderately heated to a temperature of about 200° F. (90° C.) before adding the PEO. These two components are then mixed thoroughly using a spatula or other mixing device such as a variable speed electric blender. Mixing is continued until the mixture becomes a viscous fluid constituting a binder slurry, with no evidence of PEO powder clumps in the mixture. Mixing time is approximately 10 minutes.

After mixing, the binder slurry is allowed to cool, preferably for about 2 hours, and then to settle, preferably for at least about 24 hours, prior to use. It is important that the binder be cool and free of air bubbles prior to use.

Xanthan gum is preferably added to the water/PEO mixture. When this is done, the xanthan gum is added to the water/PEO after it is mixed for 10 minutes, then mixing is continued for another 10 minutes with the xanthan gum in the mixture, prior to cooling. It has been discovered that xanthan gum additions increase shelf life by decreasing the tendency for separation between PEO and water. Xanthan gum is preferably added in an amount of from 0.2% to about 0.4% by weight of the total binder. In one particularly preferred embodiment, the PEO constitutes from about 20% to about 25% by weight, more preferably about 20% by weight; the water constitutes from about 75% to about 80% by weight, more preferably slightly less than about 80% by weight; and the xanthan gum constitutes from about 0.2% to about 0.4% by weight, more preferably about 0.3% by weight. For example, the slurry contains about 20% by weight PEO, 79.7% by weight water, and 0.3% by weight xanthan gum. Xanthan gum-is available from, for example, the Nutrasweet Kelco Company of San Diego, Calif. Mixing is carried out as described above, with the xanthan gum added to the water after the PEO.

The invention has the advantage that it employs a binder that is solvent-free, defined herein as containing essentially no organic solvents such as acetone, 111' trichloroethane, and toluene. The binder employed with this invention has the advantages that it is environmentally safe, that it contains no harmful solvents, that it is water-based rather than solvent-based, that it is easy to clean up when spilled, that it is odorless, that it has a longer shelf life than previous binders, that both PEO and xanthan gum raw materials are in easy-to-handle powder form, that it exhibits excellent burn-off properties, and that its raw materials are abundant and relatively inexpensive. A further advantage is that it exhibits good loading capabilities, which reduces the risk of voiding.

The binder slurry is then added to the oxide powder to form a stopoff slurry. The stopoff slurry comprises from about 20% to about 25% by weight binder, more about 20% by weight binder.

The stopoff slurry further comprises preferably between about 75% and about 80% by weight oxide, preferably in powder form. The oxide must be capable of withstanding the brazing temperatures of the particular application, and should have good flow properties when in slurry form with the binder. The currently preferred oxide is alumina. One especially preferred stopoff slurry contains from about 75% to about 80% by weight alumina, and more preferably about 80% by weight alumina. The alumina has a particle size preferably between about 100 grit and about 220 grit, more preferably about 120 grit. One suitable alumina for this application is available from A & B Deburring in Cincinnati, Ohio under the grade designation D50TF5/58 Class D.

The stopoff slurry is charged into internal cavities of the component to be repaired and pressed to the desired depth, and its exposed surface texture smoothed out. The component is then placed in an air oven under conditions sufficient to dry the binder so as to set the stopoff slurry, yield a hardened internal stopoff material, and minimize the risk of outgassing during subsequent brazing. In one preferred embodiment these conditions include a drying temperature of between about 130° F. (55° C.) and about 175° F. (80° C.) for at least about 15 minutes, preferably for between about 15 and about 45 minutes.

The component is removed from the drying oven and is ready for brazing, which is carried out as normal. After the brazing operation, the internal hardened stopoff material is removed by probing with a rigid probe such as a dental pick or by blowing with compressed air.

In addition to preventing the flow of braze alloy to interior surfaces of a component, the stopoff material and method discussed above are more broadly applicable to prevent flow of braze alloy to areas other than internal cavities. For example, the stopoff material can be placed in a slot to prevent braze alloy from flowing into the slot, as with a seal slot in an airfoil. It is also used in this fashion to build a bridge of braze alloy over a slot or the like. It is also applicable to creating a dam to prevent braze alloy from flow to a particular area on the surface of a component. In these applications, a quantity of the stopoff slurry is placed onto a surface of the component such as in a slot or along a surface where a dam is to be constructed. The stopoff slurry is then dried to set the binder and form a hardened stopoff material on the surface to form a barrier to flow of brazing material.

As various changes could be made in the above methods and materials without departing from the scope of the invention, it is intended that all matter contained in the above description shall be interpreted as illustrative and not in a limiting sense.

What is claimed is:

1. A method for forming a barrier to flow of brazing alloy on a component to be treated by brazing, the method comprising:

applying a quantity of stopoff slurry comprising an oxide powder and a binder to a surface of the component; and drying the stopoff slurry to set the binder and form a hardened stopoff material on the surface to form a barrier to flow of brazing alloy;

wherein the oxide powder is alumina and the binder is a polyethylene oxide binder; and wherein the polyethylene oxide binder is solvent-free.

2. The method of claim 1 wherein the stopoff slurry comprises from about 75% by weight to about 80% by weight alumina and from about 20% by weight to about 25% by weight polyethylene oxide binder.

3. The method of claim 2 wherein the polyethylene oxide binder comprises from about 75% by weight to about 80% by weight water and from about 20% by weight to about 25% by weight polyethylene oxide.

4. A method for preventing flow of brazing alloy into an internal cavity of a component being repaired by brazing, the method comprising:

charging the internal cavity with a stopoff slurry comprising an oxide powder and a binder; and drying the stopoff slurry to set the binder and form a hardened stopoff material in the internal cavity which seals openings into the internal cavity;

wherein the binder is a polyethylene oxide binder and the oxide powder is alumina; and wherein the polyethylene oxide binder is solvent-free.

5. The method of claim 4 wherein the stopoff slurry comprises from about 75% by weight to about 80% by weight alumina and from about 20% by weight to about 25% by weight polyethylene oxide binder.

6. The method of claim 5 wherein the polyethylene oxide binder is solvent free and comprises from about 75% by weight to about 80% by weight water and from about 20% by weight to about 25% by weight polyethylene oxide.

7. The method of claim 4 wherein the polyethylene oxide binder comprises from about 0.2% to about 0.4% xanthan gum.

8. The method of claim 4 wherein said drying the stopoff slurry is accomplished by exposing the component to a temperature between about 130° F. (55° C.) and about 175° F. (80° C.) for at least about 15 minutes.

9. The method of claim 4 comprising:

applying a brazing alloy to a location to be repaired on the component after forming the hardened stopoff material;

heating the brazing alloy to a brazing temperature to effect brazing;

cooling the brazing alloy to allow the brazing alloy to solidify; and removing the hardened stopoff material from the component.

10. The method of claim 9 wherein said removing the hardened stopoff material is accomplished by mechanical means selected from blowing with compressed air and scraping with a rigid probe.

11. A stopoff slurry for application to components to be treated by brazing to form a barrier to the flow of brazing alloy, the stopoff slurry comprising from about 20% by weight to about 25% by weight polyethylene oxide binder and from about 75% by weight to about 80% by weight alumina, and the polyethylene binder comprising polyethylene oxide and water.

12. The stopoff slurry of claim 11 wherein the polyethylene oxide binder comprises from about 75% by weight to about 80% by weight water and from about 20% by weight to about 25% by weight polyethylene oxide.

13. The stopoff slurry of claim 12 wherein the polyethylene oxide binder comprises from about 0.2% to about 0.4% xanthan gum.

14. The stopoff slurry of claim 11 wherein the polyethylene oxide binder is solvent-free.

* * * * *

UNITED STATES PATENT AND TRADEMARK OFFICE
CERTIFICATE OF CORRECTION

PATENT NO. : 6,460,754 B1
DATED : October 8, 2002
INVENTOR(S) : Messelling et al.

It is certified that error appears in the above-identified patent and that said Letters Patent is hereby corrected as shown below:

<u>Title page,</u>
Item [74], *Attorney, Agent, or Firm*, should read
-- David L. Narciso; Senniger, Powers, Leavitt & Roedel --.

Signed and Sealed this

Thirteenth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,460,754 B1
DATED : October 8, 2002
INVENTOR(S) : Messelling et al.

It is certified that error appears in the above-identified patent and that said Letters Patent is hereby corrected as shown below:

<u>Title page,</u>
Insert Assignee to read -- General Electric Company, Schnectady, N.Y. --.

Signed and Sealed this

Seventeenth Day of June, 2003

JAMES E. ROGAN
*Director of the United States Patent and Trademark Office*